(12) United States Patent
Peters et al.

(10) Patent No.: US 9,034,465 B2
(45) Date of Patent: May 19, 2015

(54) THERMALLY INSULATIVE ATTACHMENT

(75) Inventors: Donald W. Peters, Colchester, CT (US); George J. Kramer, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 78 days.

(21) Appl. No.: 13/492,353

(22) Filed: Jun. 8, 2012

(65) Prior Publication Data

US 2013/0330569 A1     Dec. 12, 2013

(51) Int. Cl.
*B32B 5/18* (2006.01)
*F02C 7/24* (2006.01)
*F02K 1/82* (2006.01)
*E04F 13/08* (2006.01)

(52) U.S. Cl.
CPC .............. *F02C 7/24* (2013.01); *Y10T 428/233* (2015.01); *Y10T 428/12479* (2015.01); *Y10T 428/24008* (2015.01); *B32B 5/18* (2013.01); *E04F 13/0866* (2013.01); *F05D 2300/2261* (2013.01); *F02K 1/822* (2013.01); *F05D 2300/614* (2013.01); *F05D 2300/2118* (2013.01); *F05D 2300/2112* (2013.01); *Y02T 50/675* (2013.01)

(58) Field of Classification Search
CPC .............. F05D 2300/2118; F05D 2300/2112; E04F 13/0866; B32B 5/18; Y02T 50/675
USPC ...................................................... 428/304.4
See application file for complete search history.

(56) References Cited

U.S. PATENT DOCUMENTS

| | | | | |
|---|---|---|---|---|
| 3,719,432 A | * | 3/1973 | Musick et al. | 416/196 R |
| 4,338,380 A | * | 7/1982 | Erickson et al. | 428/594 |
| 4,629,397 A | * | 12/1986 | Schweitzer | 416/96 R |
| 4,639,388 A | * | 1/1987 | Ainsworth et al. | 428/117 |
| 5,154,373 A | * | 10/1992 | Scott | 244/117 R |
| 5,226,598 A | * | 7/1993 | Woehrl | 239/127.1 |
| 5,236,151 A | * | 8/1993 | Hagle et al. | 244/117 A |
| 5,553,455 A | | 9/1996 | Craig et al. | |
| 6,601,349 B1 | * | 8/2003 | Corden | 52/36.5 |
| 2006/0091546 A1 | | 5/2006 | Bostanjoglo | |
| 2006/0163319 A1 | * | 7/2006 | Ervin et al. | 228/101 |
| 2008/0113163 A1 | | 5/2008 | Schlichting et al. | |
| 2009/0004425 A1 | * | 1/2009 | Lehman et al. | 428/53 |
| 2010/0047075 A1 | | 2/2010 | Schlichting et al. | |
| 2010/0266391 A1 | | 10/2010 | Schlichting et al. | |
| 2011/0116920 A1 | | 5/2011 | Strock et al. | |

FOREIGN PATENT DOCUMENTS

DE          10324819 A1 * 10/2004

OTHER PUBLICATIONS

Oxford English Dictionary entry for "cloth", 2013, Oxford University Press; see p. 1 http://www.oed.com/view/Entry/34649?rskey=Jd4pb0&result=1&isAdvanced=false&print Accessed on Oct. 9, 2013.*
English language translation for DE 10324819 A1; Generated by Espacenet (http://www.epo.org/searching/free/espacenet.html) on Sep. 24, 2014.*
International Search Report and Written Opinion, mailed Sep. 5, 2013.

* cited by examiner

*Primary Examiner* — Mark Ruthkosky
*Assistant Examiner* — Julia L Rummel
(74) *Attorney, Agent, or Firm* — Kinney & Lange, P.A.

(57) ABSTRACT

A thermally insulative component is a thermal barrier panel attached to a rigid structural member with means for attaching the insulative component to an external structure. The connection between the structural member and the thermal barrier panel is mechanically compliant to minimize inter-component stress build up during operation. The thermal barrier panel is a fiber wrapped ceramic oxide foam insulating structure.

10 Claims, 2 Drawing Sheets

THERMALLY INSULATIVE ATTACHMENT

BACKGROUND

This invention relates to thermal barriers; particularly to multi-layer thermal barrier structures with compliant interlayer mechanical connections.

The working environment in a gas turbine engine is severe. Turbine components in the hot gas path are exposed to a high temperature, high velocity, corrosive, and sometimes abrasive environment. Coatings have always been required to protect and extend the lifetime of exposed components. Traditional thermal barrier coatings usually include abrasion resistant, thermally protective ceramic layers deposited over a metallic bond coat to create a thermal gradient between the hot gas path and the underlying structure. Lower working temperature leads to an extended lifetime. Thermal barrier coatings are generally applied directly to a component and offer necessary protection.

In certain instances, however, externally applied additional thermally protective structures can enhance thermal and abrasion resistance in specific regions of the hot gas path.

SUMMARY

A thermally insulative component for mounting on an external body is a thermal barrier panel connected to a rigid structural member with means for mounting the insulative component to the external body. The connection between the structural member and the thermal barrier panel is mechanically compliant to minimize thermally induced stress build up during operation.

In an embodiment, a thermal barrier consists of a thermal barrier panel for mounting on an external body connected to a rigid structural member with means for mounting the thermal barrier panel to the external body. The connection between the structural member and the thermal barrier panel is mechanically compliant to minimize thermally induced stress build up during operation.

DETAILED DESCRIPTION

Protecting the internal components from the hot gas path in the working environment of a gas turbine engine may be a challenge. The hot gas path contains a high velocity, high temperature working medium that is corrosive and usually abrasive that may severely limit the lifetime of superalloy turbine components in the gas stream. The use of protective coatings throughout the engine may be required for successful operation as the coatings lower the internal temperature of the component and offer corrosion and abrasion protection.

Thermal barrier coatings are multilayer structures that comprise, in general, a thermally insulative ceramic top layer on an oxidation and corrosion resistant bond coat that can enhance adherence of the top layer to the superalloy component. Ceramic top layers have columnar microstructures which allow for the thermal expansion mismatch between the bond coat and ceramic top coat without causing failure of the top coat during operation. Yttria stabilized zirconia is a preferred ceramic top coat in many thermal barrier coatings. The bond coat may be a platinum aluminide alloy or a MCrAlY alloy where M is Ni or Co. The high Al content of both bond coats act to maintain a protective aluminum oxide scale at the bond coat/nickel based superalloy interface further protecting the substrate during operation.

Protective coatings other than those applied directly to turbine components may be used in applications where additional protection from the hot gas stream is required to maintain or extend component lifetime. An example, but not a limiting example, is the walls of the jet exhaust nozzle aft of the low pressure turbine in a gas turbine engine. It may be advantageous to give added protection to this area by attaching thermal barrier panels to the nozzle walls.

In an embodiment of the present invention, thermal barrier panels may be connected to a rigid structural member with attachment means for mounting the thermal barrier panels to external structures such as exhaust nozzle walls. The interconnection between the thermal barrier panel and the rigid structural member is preferred to be mechanically compliant in order to absorb relative thermal and mechanical deformations of both without damaging or losing the thermal protection. Embodiments of compliant interconnections between thermal barrier panels and their related rigid structural members are objects of the present invention.

Figure 1:
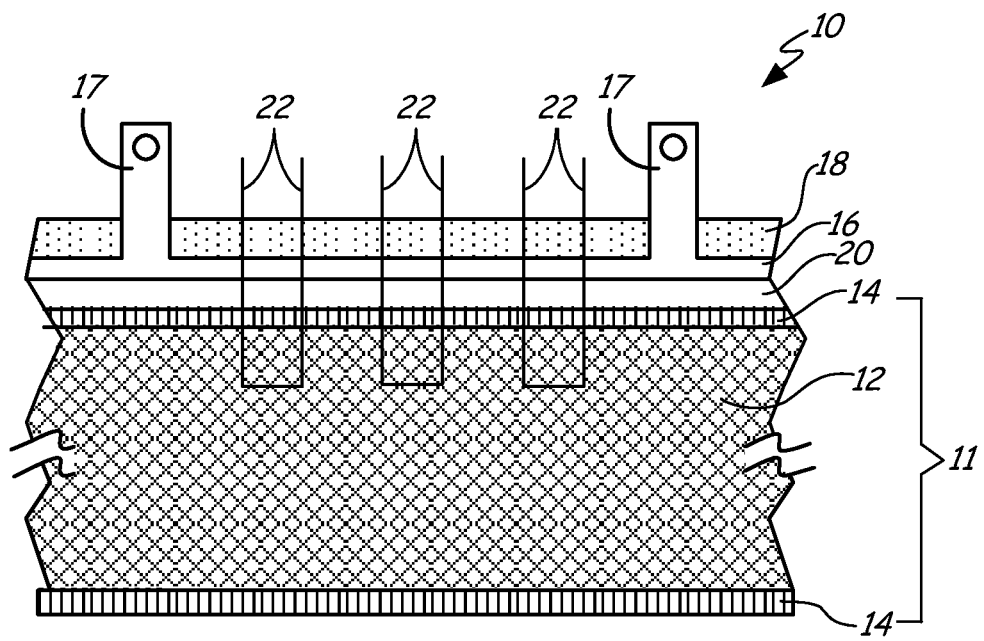
FIG. 1 is a schematic cross section of a thermal insulative component with a mechanically compliant connection between a rigid structural member and a physically separate thermal barrier panel.

FIG. 1 is a schematic cross section of a thermally insulative component illustrating an embodiment of the present invention. Thermally insulative component 10 comprises thermal barrier panel 11, rigid structural member 16 with mounting lugs 17, braze alloy 18, and attachment features 22. Thermal barrier panel 11 comprises ceramic foam insulation 12 and fiber wrapping 14. Attachment feature 22 comprises metal wires in a "horseshoe" shape as shown. In the embodiment shown, attachment features 22 have one end inserted in ceramic foam 22 thereby fixing attachment features 22 to thermal barrier panel 11. As a means of connecting thermal barrier panel 11 to rigid structural member 16, attachment features 22 may have each leg of the horseshoe penetrating rigid structural member 16 through holes, not shown, and protruding as shown. A layer of braze alloy 18 on top of rigid structural feature 16 fixes thermal barrier panel 11 to rigid structural member 16. Separation layer 20 as shown in FIG. 1 may be empty showing the only connection between thermal barrier panel 11 and rigid structural member 16 may be the wires in horseshoe connection feature 22. The mechanical compliance of the connection between thermal barrier panel 11 and rigid structural member 16 is high and may allow the required mutual movement between rigid structural member 16 and thermal barrier panel 11 that minimizes thermally induced stress during engine operation. The compliance may be controlled and depends directly on the dimensions and physical properties of horseshoe connection feature 22. In other embodiments, the wires may be thin rods or tubes.

During fabrication of thermally insulative component 10, layer 20 may be filled with a sacrificial material that can withstand the brazing temperatures, such as, but not limited to, a halide salt such as sodium or potassium chloride, that may be removed with a solvent such as water following assembly.

Mounting lugs 17 shown in FIG. 1 on rigid structural member 16 may allow thermally insulative component 10 to be mounted on, for instance, exhaust nozzle walls of a gas turbine engine for application as a thermal barrier.

Thermal barrier panel 11 may be a composite wrapped ceramic foam structure comprising an insulating ceramic foam core wrapped with ceramic fibers or cloth. The ceramic foam may include a ceramic material selected from the group comprising alumina, mullite, titania, zirconia, yttria stabilized zirconia, silicon carbide, and similar materials. The ceramic fibers may include alumina, silicon carbide, mullite, Nextel™, a product of 3M Company, St. Paul, Minn. and similar materials.

An exemplary thermal barrier panel may be a Nextel™ 720 fiber wrapped aluminum oxide foam panel produced by COI Ceramics Inc., San Diego, Calif.

Figure 3:
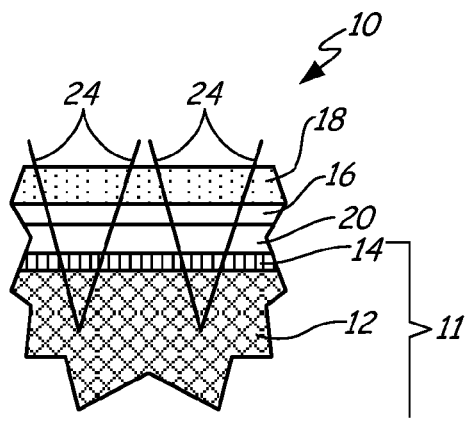
FIG. 3 is a detail of a mechanically compliant connection between a rigid structural member and a physically separate thermal barrier panel.

An embodiment showing different connecting means 24 for thermally insulative component 10 is shown as a cutout of FIG. 1 in FIG. 3. The figure shows compliant attachment feature 24 connecting thermal barrier panel 11 to rigid structural member 16. Thermal barrier panel 11 comprises ceramic foam 12 and fiber wrapping 14. Air space 20 separates thermal barrier panel 11 from rigid structural feature 16. Connecting feature 24 comprises wires, rods, or tubes imbedded at one end in ceramic foam 12 and protruding through holes, not shown, in rigid structural member 16 where they are fixed in place by braze alloy layer 18. One end of the connecting wires, rods, or tubes can be incorporated in ceramic foam 12 during manufacture of thermal barrier panel 11 or can be inserted in holes drilled in ceramic foam 12 and fixed in place by brazing.

Figure 4:
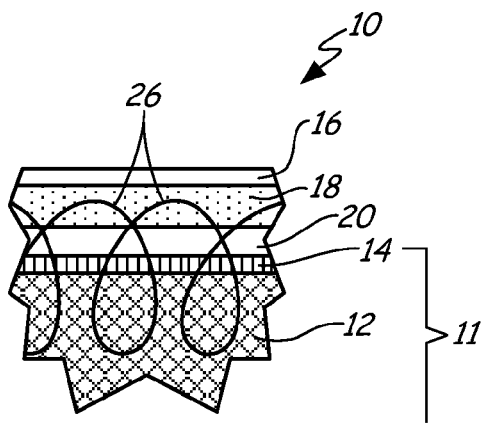
FIG. 4 is a detail of a mechanically compliant connection between a rigid structural member and a physically separate thermal barrier panel.

An embodiment showing a different mechanically compliant connection 26 for thermally insulative component 10 is shown as a cutout of FIG. 1 in FIG. 4. In this case, thermal barrier panel 11 is compliantly attached across airspace 20 to rigid structural member 16 by wire coil or wire cloth 26. Thermal barrier panel 11 comprises ceramic foam 12 and fiber wrapping 14. One end of wire coil or wire cloth 26 may be incorporated in ceramic foam 12 during manufacture of thermal barrier panel 11. In this embodiment, wire coil or wire cloth 26 is attached to rigid structural member 16 by braze alloy layer 18.

Figure 5:
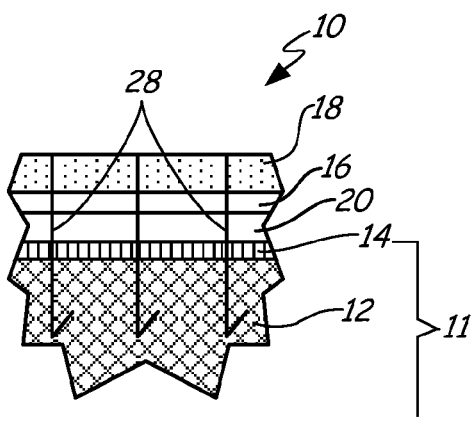
FIG. 5 is a detail of a mechanically compliant connection between a rigid structural member and a physically separate thermal barrier panel.

An embodiment showing different mechanically compliant connections 28 for thermally insulative component 10 is shown as a cutout of FIG. 1 in FIG. 5. In this case, thermal barrier panel 11 is compliantly attached across airspace 20 to rigid structural member 16 by wires, rods, or tubes 28 having barbed ends inserted in ceramic foam 12. The barbs anchor attachment 28 to thermal barrier panel 11. The barbed wires, rods, or tubes may be inserted in ceramic foam 12 during manufacture of thermal barrier panel 11 or they may be inserted in predrilled holes and fixed in place by brazing. The other ends of barbed connections 28 are inserted through holes, not shown, in rigid structural member 16 and fixed in place by braze alloy layer 18.

As noted above, during manufacture of thermally insulative component 10, with compliant interconnections 24, 26, and 28 shown in FIGS. 3, 4, and 5, respectively, free space layer 20 is filled with a high temperature sacrificial material during assembly that can withstand brazing temperatures and can be easily removed following brazing. A non-limiting example of a sacrificial spacer material is a water soluble high temperature salt such as an alkali halide.

Figure 2:
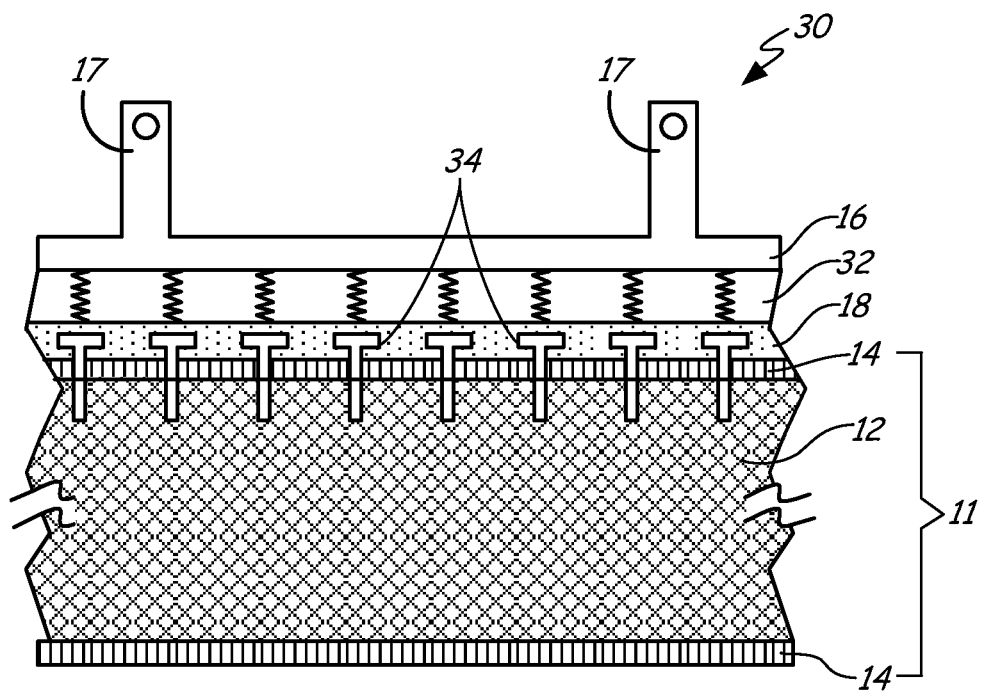
FIG. 2 is a schematic cross section of a thermally insulative component with a mechanically compliant connecting layer between a rigid structural member and a thermal barrier panel.

FIG. 2 is a schematic cross section of a thermally insulative component illustrating another embodiment of the present invention. Thermally insulative component 30 comprises thermal barrier panel 11, rigid structural member 16 with mounting lugs 17, braze alloy layer 18, attachment features 34 and mechanically compliant layer 32. Attachment features 34 comprise flat head rods, wires, or tubes inserted in ceramic foam 12. The protruding heads of the flat head attachments are fixed in place by braze alloy layer 18. Braze alloy layer 18 is attached to mechanically complaint layer 32 (schematically illustrated as containing internal springs) thereby providing a mechanically compliant connection between thermal barrier panel 11 and rigid structural member 16. Mechanically compliant layer 32 may be wire felt, metal sponge, or similar materials. Mechanically compliant layer 32 may be joined to thermal barrier panel 11 by braze alloy layer 18, as shown in FIG. 2, or by other means commonly known to those in the art.

Figure 6:
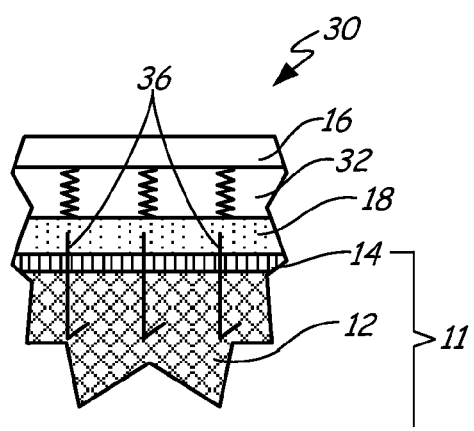
FIG. 6 is a detail of a mechanically compliant connecting layer between a rigid structural member and a thermal barrier panel.

An embodiment showing a different attachment of thermal barrier panel 11 to mechanically compliant layer 32 is shown in the cutout of FIG. 2 in FIG. 6. In the embodiment shown in FIG. 6, thermal barrier panel 11 is attached to braze alloy layer 18 by barbed wire, pins, or hollow rods 36 imbedded in ceramic foam 12 and joined in a layer by braze alloy layer 18 in a similar fashion to that shown in FIG. 5. Braze alloy layer 18 is joined to compliant layer 32 to provide a mechanically compliant connection between thermal barrier panel 11 and rigid structural member 16.

Figure 7:
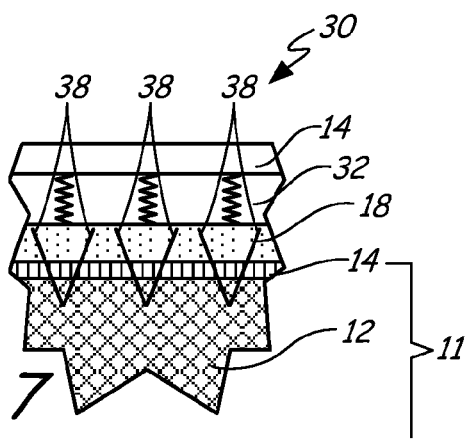
FIG. 7 is a detail of a mechanically compliant connecting layer between a rigid structural member and a thermal barrier panel.

In an embodiment shown in the cutout of FIG. 2 in FIG. 7, thermal barrier panel 11 is attached to braze alloy layer 18 by "V" wire, pins, or hollow rods 38 embedded in ceramic foam 12 and joined in a layer by braze alloy layer 18 in a similar fashion to that shown in FIG. 6. Braze alloy layer 18 is joined to compliant layer 32 to provide a mechanically compliant connection between thermal barrier panel 11 and rigid structural member 16.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are nonexclusive descriptions of possible embodiments of the present invention.

A thermally insulative component for mounting on an external body can include a thermal barrier panel, a rigid structural member including means for mounting the insulative component to the external body, and a mechanically compliant connection between the thermal barrier panel and the rigid structural member.

The component of the preceding paragraph can optionally include, additionally and/or alternatively any, one or more of the following features, configurations and/or additional components:

The thermal barrier panel can comprise a fiber wrapped ceramic foam panel;

The ceramic foam can comprise a ceramic material selected from the group comprising alumina, mullite, titania, zirconia, yttria stabilized zirconia, and silicon carbide;

The mechanically compliant connection can comprise metal wires, tubes, rods or cloth bridging a separation distance between the thermal barrier panel and the rigid structural member;

The wires, tubes, rods or cloth can have one end embedded in the ceramic foam and the other end attached to the rigid structural member by braze alloy;

The wires, tubes, rods or cloth can be attached to the ceramic foam of the thermal barrier panel during manufacture of the thermal barrier panel or by mechanical insertion in predrilled holes or other cavities followed by brazing after manufacture of the thermal barrier panel;

The mechanically compliant connection can comprise a metal or metal/ceramic felt or sponge layer between and in contact with the thermal barrier panel and the rigid structural member;

The mechanically compliant felt or sponge layer can be bonded to a braze layer on the thermal barrier panel wherein the braze layer is bonded to mechanical fasteners connecting the thermal barrier panel to the braze layer;

The mechanical fasteners can comprise wire, tubes, rods, or cloth attached to the ceramic foam of the thermal barrier panel by incorporating them during manufacture of the thermal barrier panel or by mechanical insertion in predrilled holes or other cavities in the foam followed by brazing;

The thermal barrier panel can comprise Nextel™ ceramic oxide fiber wrapped ceramic foam.

A thermal barrier for mounting on an external body can comprise a thermal barrier panel, a rigid structural member including means for mounting the thermal barrier to the external body and a mechanically compliant connection between the thermal barrier panel and the rigid structural member.

The thermal barrier of the preceding paragraph can optionally include, additionally and/or alternatively any, one or more of the following features, configurations and/or additional components:

A thermal barrier panel comprising a wrapped ceramic foam panel;

A ceramic foam comprising a ceramic material selected from the group comprising alumina, mullite, titania, zirconia, yttria stabilized zirconia, and silicon carbide and a wrap material comprising fibers selected from the group comprising alumina, silicon carbide, mullite, and Nextel™;

A mechanically compliant connection can comprise wires, tubes, rods, or cloth bridging a separation distance between the thermal barrier panel and the rigid structural member;

The wires, tubes, rods, or cloth can have one end embedded in the ceramic foam of the thermal barrier panel and the other end attached to the rigid structural member by braze alloy;

A mechanically compliant connection can comprise a metal or metal/ceramic felt or sponge layer between and in contact with the thermal barrier panel and the rigid structural member;

The wires, tubes, rods, or cloth can be attached to the ceramic foam of the thermal barrier panel by incorporating them during manufacture of the thermal barrier panel or by mechanical insertion in predrilled holes or other cavities followed by brazing after manufacture of the thermal barrier panel;

The mechanically compliant felt or sponge layer can be bonded to a braze layer on the thermal barrier panel wherein the braze layer can be bonded to mechanical fasteners connecting the thermal barrier panel to the braze layer;

The mechanical fasteners can comprise wire, tubes, rods, or cloth attached to the ceramic foam of the thermal barrier panel by incorporating them during manufacture of the thermal barrier panel or by mechanical insertion in predrilled holes or other cavities in the foam followed by brazing;

The thermal barrier panel can comprise Nextel™ ceramic oxide fiber wrapped ceramic foam.

The invention claimed is:

1. A thermally insulative component for mounting on an external body comprising:
    a thermal barrier panel comprising a fiber-wrapped ceramic foam panel;
    a rigid structural member with a first side including means for mounting the insulative component to the external body, and a second side opposite the first side and facing the thermal barrier panel;
    an air space defined between the second side of the rigid structural member and the thermal barrier panel, and separating the thermal barrier panel from the rigid structural member;
    a plurality of substantially U- or V-shaped mechanically compliant connections extending through the rigid structural member, bridging the air space at regular intervals, and securing the thermal barrier panel to the rigid structural member while absorbing relative thermal and mechanical deformations of the rigid structural member and the thermal barrier panel; and
    a braze alloy layer abutting the first side of the rigid structural member, and securing the mechanically compliant connections to the rigid structural member.

2. The thermally insulative component of claim 1, wherein the ceramic foam comprises a ceramic material selected from the group comprising alumina, mullite, titania, zirconia, yttria stabilized zirconia, and silicon carbide.

3. The thermally insulative component of claim 1, wherein the mechanically compliant connection comprises metal wires, pins, rods, or hollow rods bridging a separation distance between the thermal barrier panel and the rigid structural member.

4. The thermally insulative component of claim 3, wherein the wires, pins, rods, or hollow rods have one end embedded in the thermal barrier panel.

5. The thermally insulative component of claim 4, wherein the thermal barrier panel comprises a fiber wrapped ceramic foam panel, and wherein the wires, tubes, rods, or cloth are attached to the ceramic foam panel during manufacture of the thermal barrier panel or by mechanical insertion in predrilled holes or other cavities followed by brazing after manufacture of the thermal barrier panel.

6. The thermally insulative component of claim 1, wherein the thermal barrier panel comprises ceramic oxide fiber cloth wrapped ceramic foam.

7. A thermally insulative component for mounting on an external body comprising:
    a thermal barrier panel comprising a fiber-wrapped ceramic foam panel;
    a rigid structural member with a first side including means for mounting the insulative component to the external body, and a second side opposite the first side and facing the thermal barrier panel;
    a mechanically compliant connection extending through the rigid structural member and between the thermal barrier panel and the rigid structural member, the mechanically compliant connection formed via a plurality of U- or V-shaped attachment features embedded in the thermal barrier panel; and a braze alloy layer abutting the first side of the rigid structural member, and securing the mechanically compliant connection to the rigid structural member.

8. The thermally insulative component of claim 7, wherein the plurality of attachment features bridge an air space separating the thermal barrier panel from the rigid structural member.

9. The thermally insulative component of claim 7, wherein the attachment features comprise wires, pins, rods, or hollow rods.

10. The thermally insulative component of claim 7, wherein the attachment features are incorporated within the wrapped ceramic foam panel during manufacture, or inserted into predrilled holes or other cavities in the wrapped ceramic foam panel.

* * * * *